United States Patent Office 3,318,771
Patented May 9, 1967

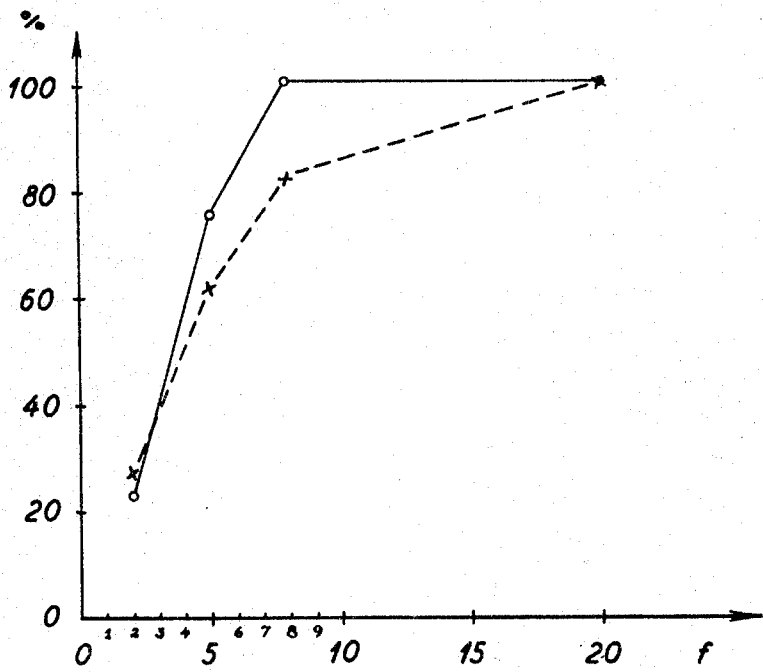

3,318,771
PROCESS FOR THE RECOVERY OF PLASMINOGEN FROM ANIMAL BLOOD SERUM OR ANIMAL BLOOD PLASMA, PREFERABLY FROM PIG'S BLOOD
Villy Johannes Jensen, Vanlose, Denmark, assignor to Novo Terapeutisk Laboratorium A/S, Copenhagen, Denmark
Filed Dec. 2, 1963, Ser. No. 327,339
Claims priority, application Denmark, Dec. 10, 1962, 5,339/62; Oct. 29, 1963, 5,095/63
7 Claims. (Cl. 167—65)

It is known to recover plasminogen from human blood plasma by removing the fibrinogen content of the plasma and precipitating the so-called euglobulin fraction from the resulting blood serum, whereafter the euglobulin fraction is worked up to plasminogen. The plasminogen may then be activated to plasmin by treatment with enzymes, for example with streptokinase, trypsin or urokinase.

After removal of the fibrinogen, some of the known methods for recovering plasminogen from human blood make use of a strong dilution of the serum whereafter an euglobulin fraction is precipitated at a specific pH-value and then worked up to plasminogen. Thus, it is known to dilute human serum twenty times and to adjust the pH-value of the resulting liquid to 5.2 to 5.3 for precipitation of an euglobulin fraction. It is also known to employ a 10 times dilution and then to adjust the pH-value to 5.3 while working at a temperature from 0 to 4° C.

Hitherto, one has maintained an attitude of reserve towards the clinical use of plasmin which has been recovered from animal blood, because the question is of a protein which is foreign to the human body.

Furthermore, human blood and animal blood differ on various points. Firstly, the quantitative composition of human blood differs from that of animal blood, e.g. as regards the ratio between the electrophoretically separable components albumin and $\alpha$-, $\beta$- and $\gamma$-globulins. Secondly, some proteins present in one of the blood species do not occur in the other one and vice versa. Thirdly, one and the same blood protein component isolated from blood of different animals often shows differences as well as regards chemical constitution as chemical properties. The latter fact among other things results in the difference between human plasminogen and animal plasminogen. Thus, human plasminogen may be activated by streptokinase while ox plasminogen and pig plasminogen are practically not activated by this enzyme.

On the basis of the above mentioned differences it is understandable that one has always emphasized the risk of antigen formation when using animal plasmin in the clinics. Thus, a preparation is known which contains animal plasmin for the treatment of wounds. Intravenous use of the said preparation is, however, prohibited.

However, it has been found that it is possible to recover an animal plasminogen which after activation to plasmin can be employed in the human clinic without appreciable risk of anaphylaxia or other harmful effects.

The purpose of the present invention, which is concerned with a process for the recovery of plasminogen from animal blood serum or animal blood plasma, preferably from pig's blood, is to provide an euglobulin precipitation by which there can be obtained a satisfactory plasminogen content while simultaneously reducing the quantity of accompanying organic matter which is to be removed by the further processing.

The invention is based upon the following experiments: 50 ml. portions of serum from pig's blood having been prepared as described below were diluted with different amounts of distilled water. Each portion of diluted serum was adjusted to a pH-value of 5.25 and was left overnight at 0° C. whereby there was obtained a precipitate which was dissolved in 25 ml. of dilute sulfuric acid at a pH-value of 2 to 3 after separation of the liquid by centrifugation. The resulting solutions were then analyzed to determine their plasmin content (plasmin activity after activation of plasminogen content) and the total amount of the content of organic matter.

After fixing at 100 the plasmin activity as well as the total amount of organic matter precipitated at a pH-value of 5.3, a temperature of 0° C. and a degree of dilution of 20, the plasmin content and the total amount of organic matter found by the above experiments were calculated in percent of these reference values. The "degree of dilution" means the ratio between the volume of diluted precipitation solution and the volume of the employed amount of serum.

The results of the experiments are compiled in the graphs shown in the drawing. The abscissa shows the degree of dilution and the ordinate shows the percent values found for the plasmin content and the total amount of organic matter in the precipitates. Thus, the upper full-drawn graph shows the relation between the plasmin activity of the precipitated matter and the degree of dilution, whereas the lower dashed graph shows the total amount of precipitated organic matter in relation to the degree of dilution.

Furthermore, it has been found that the course of the graphs does not change materially when precipitating at higher temperatures, e.g. at 25° C., although at a temperature of 0° C. there is obtained a higher yield of as well precipitated matter as of plasmin than at 25° C.

It appears from the two graphs that the plasmin activity remains practically equal to 100 percent of the reference activity when the degree of dilution is reduced from 20 to 10 while the total yield of precipitated organic matter is evenly reduced by this reduction of the degree of dilution. However, in case the latter is brought down to a value below 10 there appears a surprisingly abrupt change in the mutual course of the graphs, said graphs being practically parallel at a degree of dilution of about 8 because as well the graph showing the plasmin content as that showing the total amount of precipitated organic matter exhibit a break in downward direction. As the full-drawn graph exhibits a drastically decreasing plasmin content at lower degrees of dilution than about 5, and as the two graphs also approach each other quickly in this dilution range, it is thus seen that by employing a relatively low degree of dilution there is obtained a plasmin content which is satisfactory for a production on a technical scale as well as a simultaneous reduction of the amount of accompanying organic matter which is to be removed during the further processing.

Experiments similar to the above ones have shown that it is not necessary to separate the fibrinogen content from the employed plasma prior to the plasminogen precipitation, and that by omitting this step, i.e. by employing animal blood plasma as starting material, there can also be obtained a plasminogen precipitate which after activation possesses a satisfactory plasmin activity.

On the basis of the unexpected result of the above investigations the process according to the invention is characterized by diluting the serum or the plasma 5 to 8 times with water and adjusting the pH-value to 5 to 6 whereafter the resulting precipitate is separated.

This euglobulin precipitate may be worked up to plasminogen in a manner known per se and can then be activated to plasmin.

Both tap water and distilled water can be used as diluting agent. The diluting agent may, however, contain salts but only in so small quantities that they do not alter the ionic strength in considerable degree in view of the fact that at a too high ionic strength the composition of the precipitated protein fraction is changed unfavorably.

The low degree of dilution employed for the animal blood serum or plasma is especially advantageous when producing plasmin on a technical scale because the considerable liquid volumes which are to be further worked up when employing high degrees of dilution are avoided.

Since it appears from the graphs commented upon above that at a degree of dilution of about 8 there is obtained partly an euglobulin precipitate having a high plasmin content, partly a relatively small amount of accompanying organic matter, only, one might obviously have reason to prefer a degree of dilution being in the upper part of the interval from 5 to 8. However, a closer investigation shows that the most economical processing is attained at a degree of dilution from 5 to 6. Thus, according to the invention it is especially preferred to employ that dilution. The basis for fixing this economically optimum degree of dilution is that the price per unit of recovered plasmin can be calculated as a sum of two variables one of which has its lowest value at degrees of dilution in the upper part of the range employed while the other variable has its lowest value in the lower part of the range.

In view of the above mentioned differences between human blood and animal blood it could not be expected that the pH-value of about 5.2 to 5.3 employed in the known methods for precipitating euglobulin in human blood serum would also be the optimum value in the present precipitation. However, according to the invention it has also been found most appropriate to adjust the pH-value to 5.25 after the dilution.

The process of the invention shall be further illustrated in the following specific examples. The blood plasma and the blood serum used as starting materials in the examples and in the experiments referred to above are prepared in the following manner: Immediately following the drawing-off there is added to the blood a solution containing an anti-coagulation agent and, if desired, one or more antibiotics, followed by cooling. The blood thus treated is centrifuged and the blood corpuscles are removed whereafter the blood plasma remains.

The serum is prepared by recalcifying the plasma by adding calcium chloride thereto. The plasma is then left for some hours while vigorously stirring, whereby the fibrin is precipitated. The latter is separated and the remaining serum is employed for the experiments in which serum is used as starting material.

RECOVERY OF PLASMINOGEN FROM SERUM FROM PIG'S BLOOD

Example 1

200 ml. of distilled water are added to 50 ml. of serum from pig's blood (degree of dilution $f=5$), the pH-value is adjusted to 5.00 with acetic acid, and the mixture is left overnight at 0° C. and then centrifuged. The euglobulin precipitate formed is separated and dissolved in 25 ml. of dilute sulfuric acid whereupon the solution is analyzed to determine the total amount of organic matter and the plasmin activity of the plasminogen content after activation, the values obtained by a corresponding euglobulin precipitation at a degree of dilution of 20, a pH-value of 5.3 and a temperature of 0° C. being fixed at 100, whereafter the amounts found in the experiment are calculated in percent of the reference values.

In this manner there is found a plasmin content of 71.5 percent and a relative specific activity of 124 percent (the ratio between the plasmin content in percent and the amount of precipitated organic matter in percent after multiplication by the factor 100).

Similarly, the following results are obtained while employing other combinations of temperatures, pH-values, and degrees of dilution than those employed above.

| Ex. No. | Degree of dilution, $f$ | Temperature, °C. | pH value | Plasminogen activity, percent | Relative specific activity, percent |
|---|---|---|---|---|---|
| 2 | 8 | 0 | 5.00 | 89.3 | 123 |
| 3 | 5 | 0 | 5.25 | 75.4 | 122 |
| 4 | 8 | 0 | 5.25 | 100.6 | 122 |
| 5 | 5 | 0 | 5.50 | 63.8 | 116 |
| 6 | 8 | 0 | 5.50 | 86.2 | 116 |
| 7 | 5 | 12.5 | 5.25 | 58.5 | 121 |
| 8 | 8 | 12.5 | 5.25 | 82.8 | 120 |
| 9 | 5 | 25 | 5.25 | 57.6 | 122 |
| 10 | 8 | 25 | 5.25 | 81.6 | 117 |

It appears from the above table that in a relatively broad temperature interval, especially at a pH-value of 5.25 there is obtained as well a high plasminogen acticity as a high relative specific activtiy by employing dilution degrees of 5 and 8, respectively.

RECOVERY OF PLASMINOGEN FROM SERUM FROM OX BLOOD

Examples 11–12

In the manner described in the preceding examples euglobulin precipitates are prepared from 50 ml. portions of serum from ox blood:

| Ex. No. | Degree of dilution, $f$ | Temperature, °C. | pH value | Plasminogen activity, percent | Organic matter, percent | Relative specific activity, percent |
|---|---|---|---|---|---|---|
| 11 | 8 | 0 | 5.3 | 101 | 79.5 | 127 |
| 12 | 5 | 0 | 5.3 | 85.1 | 63.6 | 134 |

RECOVERY OF PLASMINOGEN FROM PLASMA FROM PIG'S BLOOD

Example 13

50 ml. of plasma from pig's blood are diluted 5 times with distilled water (200 ml.), the pH-value is adjusted to 5.3 with acetic acid and the mixture is left overnight at 0° C., whereafter it is centrifuged. The euglobulin precipitate formed is separated and dissolved in 25 ml. of dilute sulfuric acid, and then the solution is analyzed to determine the total content of organic matter as well as the plasmin activity of the precipitated plasminogen after activation, the values for said variables which are found by means of an euglobulin precipitation of serum at a degree of dilution of 20, a pH-value of 5.3 and a temperature of 0° C. being fixed at 100, whereafter the amounts found in the experiment are calculated in percent of the reference values.

In the above example there is found in this manner a plasmin activity of 81.8 percent, a content of organic matter of 149 percent and a relative specific activity of $$\frac{81.8}{149} \times 100\% = 54.9 \text{ percent}$$

Similarly, the results compiled in the following table are obtained while employing pig plasma and different combinations of degree of dilution, temperature, and pH-value.

| Ex. No. | Degree of dilution, $f$ | Temperature, °C. | pH value | Plasmin activity, percent | Organic matter, percent | Relative specific activity, percent |
|---|---|---|---|---|---|---|
| 14 | 5 | 0 | 5.3 | 78.8 | 159 | 49.6 |
| 15 | 8 | 0 | 5.3 | 98.4 | 153 | 64.3 |
| 16 | 8 | 0 | 5.3 | 101 | 155 | 65.2 |

It appears from the above examples that under conditions corresponding to those employed when precipitating from serum it is possible to precipitate a considerable amount of the plasmin activity directly from pig's plasma.

Having thus fully described my invention I claim as new and desire to secure by Letters Patent:

1. A process for the recovery of plasminogen from a substance selected from the group consisting of animal blood serum and animal blood plasma, which comprises diluting said substance 5 to 8 times with water, adjusting the pH-value of the diluted substance to 5 to 6, and separating the resulting precipitate.

2. A process for the recovery of plasminogen from a substance selected from the group consisting of animal blood serum and animal blood plasma, which comprises diluting said substance 5 to 6 times with water, adjusting the pH-value of the diluted substance to 5 to 6, and separating the resulting precipitate.

3. A process for the recovery of plasminogen from a substance selected from the group consisting of animal blood serum and animal blood plasma, which comprises diluting said substance 5 to 8 times with water, adjusting the pH-value of the diluted substance to 5.25, and separating the resulting precipitate.

4. A process for the recovery of plasminogen from a substance selected from the group consisting of serum from pig's blood and plasma from pig's blood, which comprises diluting said substance 5 to 8 times with water, adjusting the pH-value of the diluted substance to 5 to 6, and separating the resulting precipitate.

5. A process for the recovery of plasminogen from a substance selected from the group consisting of serum from pig's blood and plasma from pig's blood, which comprises diluting said substance 5 to 6 times with water, adjusting the pH-value of the diluted substance to 5.25, and separating the resulting precipitate.

6. A process for the recovery of plasminogen from a substance selected from the group consisting of serum from pig's blood and plasma from pig's blood, which comprises diluting said substance 5 to 6 times with water, adjusting the pH-value of the diluted substance to 5.25, allowing the diluted substance to stand at a temperature of the order of 0° C. to 25° C., and separating the resulting precipitate.

7. A process for the recovery of plasminogen from ox serum, which comprises diluting said serum 5 to 8 times with water, adjusting the pH-value of the diluted serum to 5 to 6, and separating the resulting precipitate.

References Cited by the Examiner

Newcomb: The New England Journal of Medicine, vol. 260, No. 11, pp. 545–548, March 1959.

Shapiro: Scientific American, vol. 84, pp. 18–21, March 1951.

ALBERT T. MEYERS, *Primary Examiner.*

LEROY B. RANDALL, *Assistant Examiner.*